June 26, 1956　　　　H. F. IVEY　　　　2,752,521
SCREEN MATERIAL
Filed April 9, 1953
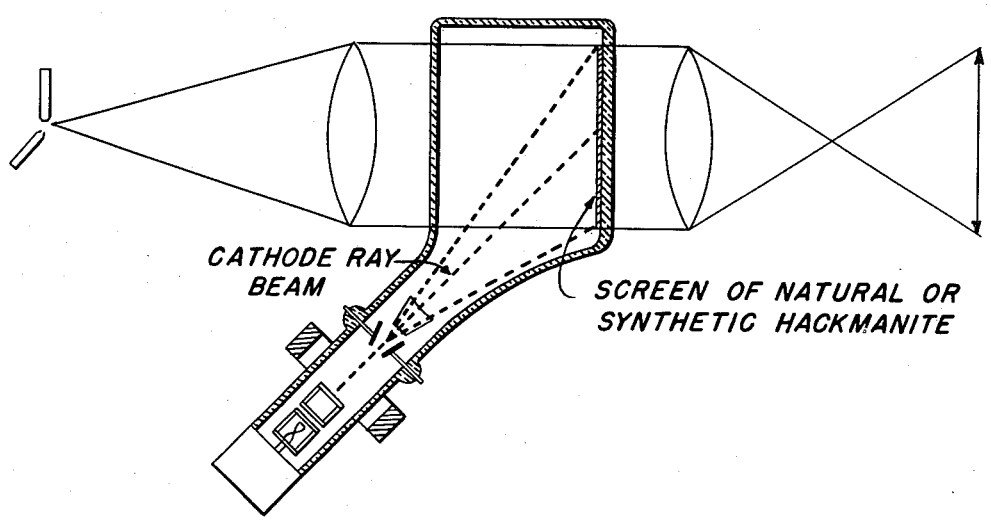
INVENTOR
*Henry F. Ivey*
BY *Cushman, Darby & Cushman*
ATTORNEYS

United States Patent Office 2,752,521
Patented June 26, 1956

2,752,521
SCREEN MATERIAL

Henry F. Ivey, Bloomfield, N. J.

Application April 9, 1953, Serial No. 347,729

8 Claims. (Cl. 313—92)

The present invention relates to cathode ray devices and particularly to such devices having image screen material the transparency or coloration of which is subject to alteration by a cathode ray beam impinging thereon. Such tubes are useful in radar and television because an image traced out on the screen may be used in a projection system. That is, light may be directed through or reflected from the screen and projected so as to permit a small area of image to be reproduced into a large scale reproduction on a viewing screen. Moreover, regardless of magnification, this type of tube is highly useful in radar because it is possible to arrange the screen to retain an image for a long period of time. There are also direct view tubes of this type, which in many instances are preferable due to high contrast which may be obtained.

The present invention pertains to new materials for the image screen of such devices. The invention hereinbelow claimed is in having the image forming screens made of naturally occurring hackmanite, or synthetic hackmanite corresponding to that occurring naturally, or other synthetic hackmanites varying in certain manner from naturally occurring hackmanite.

As is known, hackmanite is a fairly uncommon mineral, but is to be found in several places, for example, in Greenland, Korea, India, the Kola Peninsula of Russia, Dungannon Township, Ontario, Canada, the Ice River Region, British Columbia, Canada and in the United States at Magnet Cove, Arkansas.

In accordance with the foregoing, the primary object of this invention is to provide an image forming screen for a cathode ray device, the screen being made of naturally occurring hackmanite, or synthetic hackmanite corresponding to that naturally found, or other synthetic hackmanites varying from the natural hackmanite. Further objects are expressed or are obvious from the following detailed description and the appended claims.

The accompanying drawing shows a representative type of cathode ray device with the image screen according to the present invention indicated by the legend. It will be understood that, apart from the said screen, no particular design of the device is important to the present invention.

By this invention, synthetic hackmanites are proposed, in addition to natural hackmanite for screen material, the synthetic hackmanites being selectively prepared so that the number of molecules of NaCl or other alkali-halide may be varied, as for example, between zero and two. It may be briefly stated that according to the best chemical analysis, hackmanite can be represented by the gross chemical formula $Na_4Al_3Si_3O_{12}Cl$ or by the structural formula $3Na_2O.3Al_2O_3.6SiO_2.2NaCl$. Accordingly, in addition to natural occuring hackmanite and a synthetic hackmanite to correspond thereto according to the structural formula $3Na_2O.3Al_2O_3.6SiO_2.2NaCl$, I also intend to cover by this invention a synthetic or naturally occurring material of the structural formula $$3M'_2O.3Al_2O_3.6SiO_2.2MX$$

where M and M' are the same or different and stand for alkali metals, i. e., sodium, potassium, lithium, rubidum and cesium, and where X is a halogen, i. e. chlorine, bromine, fluorine or iodine. More broadly, I intend to include as part of my invention a screen of synthetic or naturally occurring material of the structure $$3M'_2O.3Al_2O_3.6SiO_2.xMX$$

where M and M' and X are as in the preceding example, while $x$ lies between zero and two. Still more broadly, I intend to cover as part of this invention, a synthetic or naturally occurring material consisting of the constituents $M'_2O$, $Al_2O_3$, $SiO_2$ and MX in any proportion where M, M' and X are defined as before. The variation in proportion of alkali-halide will serve to create a varying number of lattice defects in the screen material.

Referring to the drawing, the screen which is so designated by legend may be formed in the device by any convenient means. For example, the material may be sliced into a layer of desired thickness and mounted in the device, or the material may be vaporized onto the device by use of techniques well known in the art for vaporizing other screen materials onto a surface, or the powdered material may be deposited by settling from a suspending liquid, which may be non-aqueous.

What is claimed is:

1. A cathode ray device having an image screen comprising $M'_2O$, $Al_2O_3$, $SiO_2$ and MX where M and M' stand for an alkali metal and X is a halogen.

2. A cathode ray device having an image screen of natural hackmanite.

3. A device as in claim 1 wherein the screen material has the structural formula $3M'_2O.3Al_2O_3.6SiO_2.xMX$ where $x$ is between zero and two inclusive.

4. A device as in claim 1 wherein the screen material has the structural formula $3M'_2O.3Al_2O_3.6SiO_2.2MX$.

5. A device as in claim 1 wherein the screen material has the structural formula $3Na_2O.3Al_2O_3.6SiO_2.2NaCl$.

6. A device as in claim 1 wherein M and M' stand for different alkali metals.

7. A device as in claim 3 wherein M and M' stand for different alkali metals.

8. A device as in claim 4 wherein M and M' stand for different alkali metals.

References Cited in the file of this patent
UNITED STATES PATENTS

| | | |
|---|---|---|
| 2,432,908 | Leverenz | Dec. 16, 1947 |
| 2,435,435 | Fonda | Feb. 3, 1948 |
| 2,511,572 | Ellefson | June 13, 1950 |

FOREIGN PATENTS

| | | |
|---|---|---|
| 896,651 | France | Feb. 28, 1945 |

OTHER REFERENCES

De Ment: Fluorochemistry, 1945, Chemical Pub. Co., page 454. (Copy in Sci. Lib.)